(12) United States Patent
Hatabu (10) Patent No.: US 8,749,685 B2
(45) Date of Patent: Jun. 10, 2014

(54) SOLID-STATE IMAGING DEVICE, DRIVING METHOD THEREOF, AND IMAGING APPARATUS

(75) Inventor: Kazuaki Hatabu, Kumamoto (JP)

(73) Assignee: Sony Corporation (JP)

(\*) Notice: Subject to any disclaimer, the term of this patent is extended or adjusted under 35 U.S.C. 154(b) by 884 days.

(21) Appl. No.: 12/699,432

(22) Filed: Feb. 3, 2010

(65) Prior Publication Data

US 2010/0201862 A1 Aug. 12, 2010

(30) Foreign Application Priority Data

Feb. 10, 2009 (JP) ................................ 2009-028773
Jun. 2, 2009 (JP) ................................ 2009-132688

(51) Int. Cl.
*H04N 5/335* (2011.01)
*H04N 5/235* (2006.01)

(52) U.S. Cl.
USPC .......................................... 348/311; 348/362

(58) Field of Classification Search
USPC .................. 348/296, 311–323, 362, 363, 367
See application file for complete search history.

(56) References Cited

U.S. PATENT DOCUMENTS 7,561,192 B2 * 7/2009 Kobayashi ................. 348/240.2
8,300,132 B2 * 10/2012 Tanaka ........................ 348/317
2001/0030708 A1 * 10/2001 Ide et al. ...................... 348/362
2007/0273785 A1 * 11/2007 Ogawa et al. ................ 348/362
2008/0106623 A1 * 5/2008 Oshima ........................ 348/294

FOREIGN PATENT DOCUMENTS

| JP | 08-084298 | 3/1996 |
| JP | 1999-317905 | 11/1999 |
| JP | 2003-244710 | 8/2003 |

OTHER PUBLICATIONS

Japanese Patent Office; JP Application No. 2009-132688; Office Action issued Feb. 1, 2011, 2 pages.

\* cited by examiner

*Primary Examiner* — Twyler Haskins
*Assistant Examiner* — Akshay Trehan
(74) *Attorney, Agent, or Firm* — Sheridan Ross P.C.

(57) ABSTRACT

A solid-state imaging device includes: light receiving portions that accumulate signal charges corresponding to incident light; charge transfer portions that are formed to be adjacent to the light receiving portions so as to transfer the signal charges read out from the light receiving portions; readout electrodes to which a readout voltage for reading out the signal charges accumulated in the light receiving portions to the charge transfer portions is applied; and a controller that is configured to be able to apply the readout voltage to the readout electrodes corresponding to first predetermined light receiving portions which are part of the light receiving portions in an exposure period when the signal charges are accumulated in the light receiving portions.

12 Claims, 6 Drawing Sheets

FIG.5A 
LIGHT RECEIVING PORTIONS POSITIONED ON THE (3N-2)TH ROW

FIG.5B 
LIGHT RECEIVING PORTIONS POSITIONED ON THE (3N-2)TH ROW

SOLID-STATE IMAGING DEVICE, DRIVING METHOD THEREOF, AND IMAGING APPARATUS

BACKGROUND OF THE INVENTION

1. Field of the Invention

The present invention relates to a solid-state imaging device, a driving method thereof, and an imaging apparatus. More particularly, the present invention relates to a solid-state imaging device capable of achieving a wide dynamic range, a driving method thereof, and an imaging apparatus using the solid-state imaging device capable of achieving a wide dynamic range.

2. Description of the Related Art

Recently, video cameras, still digital cameras, and other apparatuses using solid-state image sensors such as CCDs (charge coupled devices) have become popular.

Figure 12:
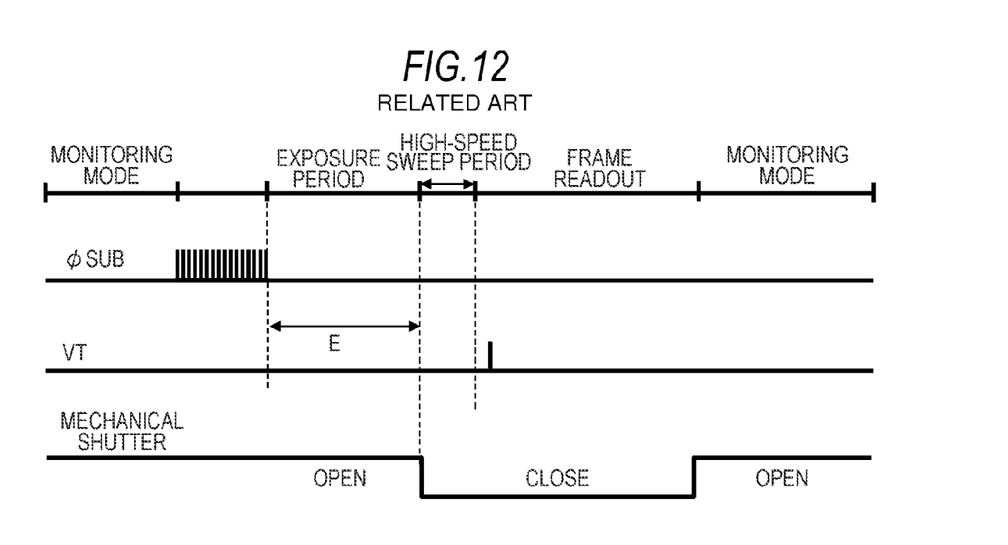
FIG. 12 is a diagram illustrating a still-image exposure sequence of the related art.

FIG. 12 is a diagram illustrating a still-image exposure sequence of the related art. According to a driving method of a solid-state imaging device according to the related art, the still-image exposure sequence includes a high-speed imaging period (monitoring mode), an exposure period, a high-speed sweep period, and a frame readout period. The still-image exposure sequence transitions to another monitoring period after the frame readout period. In the still-image exposure sequence of the related art, electronic shutter signals φSUB are generated in the exposure period, and a period (which is denoted by a symbol E in the figure) that continues from the rising time of the last electronic shutter signal to the time when a mechanical shutter is closed corresponds to the exposure period.

However, when a subject is shot with a solid-state imaging device with a narrow dynamic range, "whiteout" or "blackout" occurs which is a phenomenon where gradation data in bright or dark areas are lost.

JP-A-8-084298 discloses a technique of achieving a wide dynamic range. Specifically, according to the technique, signal charges accumulated in a first group of photoelectric conversion elements are read out first, signal charges accumulated in a second group of photoelectric conversion elements are read out subsequently, and the respective signal charges are converted into signal outputs without combining them together.

SUMMARY OF THE INVENTION

However, in the technique disclosed in JP-A-8-084298, after a readout sequence is performed for reading the signal charges accumulated in the first group of photoelectric conversion elements, another readout sequence is performed for reading the signal charges accumulated in the second group of photoelectric conversion elements. For this reason, the first and second groups of photoelectric conversion elements are subjected to readout sequences at different times.

Since the readout sequences are performed at different times, the resolution of a combined image decreases when a subject moves at a high speed or the exposure time is long.

Moreover, when a blinking subject is shot, particularly, when the blinking frequency is close to twice the frequency at which a subject is shot, the combination of the two shot images will be an image of a lighted subject and an image of an unlighted subject. It is therefore difficult to obtain a wide dynamic range appropriately.

Therefore, it is desirable to provide a solid-state imaging device, a driving method thereof, and an imaging apparatus capable of obtaining image signals with different exposure periods using the same readout sequence.

According to an embodiment of the present invention, there is provided a solid-state imaging device including: light receiving portions that accumulate signal charges corresponding to incident light; charge transfer portions that are formed to be adjacent to the light receiving portions so as to transfer the signal charges read out from the light receiving portions; readout electrodes to which a readout voltage for reading out the signal charges accumulated in the light receiving portions to the charge transfer portions is applied; and a controller that is configured to be able to apply the readout voltage to the readout electrodes corresponding to first predetermined light receiving portions which are part of the light receiving portions in an exposure period when the signal charges are accumulated in the light receiving portions.

According to another embodiment of the present invention, there is provided a solid-state imaging device including: light receiving portions that are arranged in a matrix form so as to accumulate signal charges corresponding to incident light; vertical transfer portions that are provided for each vertical column of the light receiving portions so as to transfer the signal charges read out from the light receiving portions in a vertical transfer portion; readout electrodes to which a readout voltage for reading out the signal charges accumulated in the light receiving portions to the vertical transfer portions is applied; a horizontal transfer portion to which the signal charges are transferred from the vertical transfer portions, and which transfers the transferred signal charges in a horizontal direction; and a controller that is configured to be able to apply the readout voltage to the readout electrodes corresponding to first predetermined light receiving portions which are part of the light receiving portions in an exposure period when the signal charges are accumulated in the light receiving portions.

According to still another embodiment of the present invention, there is provided an imaging apparatus which includes a solid-state imaging device and an optical system in which the solid-state imaging device includes: light receiving portions that accumulate signal charges corresponding to incident light; charge transfer portions that are formed to be adjacent to the light receiving portions so as to transfer the signal charges read out from the light receiving portions; readout electrodes to which a readout voltage for reading out the signal charges accumulated in the light receiving portions to the charge transfer portions is applied; and a controller that is configured to be able to apply the readout voltage to the readout electrodes corresponding to first predetermined light receiving portions which are part of the light receiving portions in an exposure period when the signal charges are accumulated in the light receiving portions; and, the optical system guides the incident light to the light receiving portions.

According to yet another embodiment of the present invention, there is provided an imaging apparatus which includes a solid-state imaging device and an optical system: in which the solid-state imaging device includes: light receiving portions that are arranged in a matrix form so as to accumulate signal charges corresponding to incident light; vertical transfer portions that are provided for each vertical column of the light receiving portions so as to transfer the signal charges read out from the light receiving portions in a vertical transfer portion; readout electrodes to which a readout voltage for reading out the signal charges accumulated in the light receiving portions to the vertical transfer portions is applied; a horizontal transfer portion to which the signal charges are transferred from the vertical transfer portions, and which transfers the transferred signal charges in a horizontal direction; and a controller that is configured to be able to apply the readout voltage to the readout electrodes corresponding to first predetermined light receiving portions which are part of the light receiving portions in an exposure period when the signal charges are accumulated in the light receiving portions; and, the optical system guides the incident light to the light receiving portions.

Here, the signal charges accumulated in the first predetermined light receiving portions are read out to the charge transfer portions or the vertical transfer portions at the timing at which the readout voltage is applied to the readout electrodes corresponding to the first predetermined light receiving portions by the controller. That is to say, the signal charges accumulated in the first predetermined light receiving portions are read out to the charge transfer portions or the vertical transfer portions during a period that continues from the start timing of the exposure period to the timing at which the readout voltage is applied.

Therefore, the first predetermined light receiving portions are reset to an initial state at the timing at which the readout voltage is applied to the readout electrodes corresponding to the first predetermined light receiving portions, and the accumulation of signal charges is started from the initial state.

The "exposure period when signal charges are accumulated in the light receiving portions" means a period that continues from the rising time of the last electronic shutter signal (a release timing of an electronic shutter) to the closing time of a mechanical shutter.

Moreover, the "readout electrodes corresponding to the first predetermined light receiving portions" means readout electrodes which are able to read out the signal charges accumulated in the first predetermined light receiving portions to the charge transfer portions or the vertical transfer portions upon application of the readout voltage.

Furthermore, the reason why "part of the light receiving portions" is used as the "first predetermined light receiving portions" is because at least two image signals with different exposure periods are obtained.

That is to say, if "the entirety of the light receiving portions" is used as the "first predetermined light receiving portions," the entirety of the light receiving portions will be reset to an initial state at the timing at which the readout voltage is applied to the readout electrodes corresponding to the first predetermined light receiving portions. Therefore, it is practically impossible to achieve different exposure periods since the first predetermined light receiving portions are reset to the initial state. For this reason, by using the "part of the light receiving portions" as the "first predetermined light receiving portions" and resetting only the "part of the light receiving portions" to the initial state, the exposure period of the light receiving portions which are reset to the initial state can be made different from the exposure period of the light receiving portions which are not reset to the initial state.

Moreover, when the controller is configured to be able to apply the readout voltage to the readout electrodes corresponding to the second predetermined light receiving portions which are part of the light receiving portions which are different from the first predetermined light receiving portions during the exposure period and after the readout voltage is applied to the readout electrodes corresponding to the first predetermined light receiving portions, the spectral envelope curve accumulated in the second predetermined light receiving portions are read out to the charge transfer portions or the vertical transfer portions at the timing at which the readout voltage is applied to the readout electrodes corresponding to the second predetermined light receiving portions by the controller. That is to say, the signal charges accumulated in the second predetermined light receiving portions during a period that continues from the start timing of the exposure period to the timing at which the readout voltage is applied are read out to the charge transfer portions or the vertical transfer portions.

Therefore, the second predetermined light receiving portions are reset to an initial state at the timing at which the readout voltage is applied to the readout electrodes corresponding to the second predetermined light receiving portions, and accumulation of signal charges is started from the initial state.

Moreover, the "readout electrodes corresponding to the second predetermined light receiving portions" means readout electrodes which are able to read out the signal charges accumulated in the second predetermined light receiving portions to the charge transfer portions or the vertical transfer portions upon application of the readout voltage.

Furthermore, the reason why "part of the light receiving portions which are different from the first predetermined light receiving portions" is used as the "second predetermined light receiving portions" is because at least three image signals with different exposure periods are obtained.

That is to say, if "the entirety of the light receiving portions which are different from the first predetermined light receiving portions" is used as the "second predetermined light receiving portions," the entirety of the light receiving portions which are different from the first predetermined light receiving portions will be reset to an initial state at the timing at which the readout voltage is applied to the readout electrodes corresponding to the second predetermined light receiving portions. Therefore, it is practically impossible to achieve different exposure periods since the second predetermined light receiving portions are reset to the initial state. For this reason, by using the "part of the light receiving portions which are different from the first predetermined light receiving portions" as the "second predetermined light receiving portions" and resetting only the "part of the light receiving portions which are different from the first predetermined light receiving portions" to the initial state, the exposure period of the light receiving portions which are reset to the initial state (the light receiving portions which are different from the first predetermined light receiving portions) can be made different from the exposure period of the light receiving portions which are not reset to the initial state.

According to still yet another embodiment of the present invention, there is provided a driving method of a solid-state imaging device, including reading out signal charges accumulated in first predetermined light receiving portions which are part of the light receiving portions to charge transfer portions which are formed to be adjacent to the first predetermined light receiving portions in an exposure period when signal charges corresponding to incident light are accumulated in the light receiving portions.

Here, the signal charges accumulated in the first predetermined light receiving portions during a period that continues from the start timing of the exposure period to a readout timing are read out to the charge transfer portions at the timing at which the signal charges accumulated in the first predetermined light receiving portions are read out to the charge transfer portions which are formed to be adjacent to the first predetermined light receiving portions.

Therefore, the first predetermined light receiving portions are reset to an initial state at the timing at which the signal charges are readout to the charge transfer portions which are formed to be adjacent thereto, and accumulation of signal charges is started from the initial state.

Moreover, when the signal charges accumulated to the second predetermined light receiving portions which are part of the light receiving portions which are different from the first predetermined light receiving portions are read out to the charge transfer portions which are formed to be adjacent to the second predetermined light receiving portions during the exposure period and after the signal charges accumulated in the first predetermined light receiving portions are read out, the signal charges accumulated in the second predetermined light receiving portions during a period that continues from the start timing of the exposure period to the readout timing are read out to the charge transfer portions at the timing at which the signal charges accumulated in the second predetermined light receiving portions are read out to the charge transfer portions.

Therefore, the second predetermined light receiving portions are reset to an initial state at the timing at which the signal charges are read out to the charge transfer portions which are formed to be adjacent thereto, and accumulation of signal charges is started from the initial state.

According to further another embodiment of the present invention, there is provided an imaging apparatus including: a solid-state imaging device which includes: light receiving portions that accumulate signal charges corresponding to incident light; charge transfer portions that are formed to be adjacent to the light receiving portions so as to transfer the signal charges read out from the light receiving portions; and readout electrodes to which a readout voltage for reading out the signal charges accumulated in the light receiving portions to the charge transfer portions is applied; an optical system that condenses the incident light to be received by the light receiving portions; a mechanical shutter that interrupts the incident light condensed by the optical system; and a controller that applies the readout voltage to the readout electrodes corresponding to first predetermined light receiving portions which are part of the light receiving portions in an exposure period when the signal charges are accumulated in the light receiving portions, thus setting the exposure period of the first predetermined light receiving portions to a period that continues until the mechanical shutter is closed after the readout voltage is applied to the readout electrodes corresponding to the first predetermined light receiving portions.

According to a further embodiment of the present invention, there is provided an imaging apparatus including: a solid-state imaging device which includes: light receiving portions that are arranged in a matrix form so as to accumulate signal charges corresponding to incident light; vertical transfer portions that are provided for each vertical column of the light receiving portions so as to transfer the signal charges readout from the light receiving portions in a vertical transfer portion; and readout electrodes to which a readout voltage for reading out the signal charges accumulated in the light receiving portions to the vertical transfer portions is applied; an optical system that condenses the incident light to be received by the light receiving portions; a mechanical shutter that interrupts the incident light condensed by the optical system; and a controller that applies the readout voltage to the readout electrodes corresponding to first predetermined light receiving portions which are part of the light receiving portions in an exposure period when the signal charges are accumulated in the light receiving portions, thus setting the exposure period of the first predetermined light receiving portions to a period that continues until the mechanical shutter is closed after the readout voltage is applied to the readout electrodes corresponding to the first predetermined light receiving portions.

Here, the signal charges accumulated in the first predetermined light receiving portions are read out to the charge transfer portions or the vertical transfer portions at the timing at which the readout voltage is applied to the readout electrodes corresponding to the first predetermined light receiving portions by the controller. That is to say, the signal charges accumulated in the first predetermined light receiving portions are read out to the charge transfer portions or the vertical transfer portions during a period that continues from the start timing of the exposure period to the timing at which the readout voltage is applied. Therefore, the first predetermined light receiving portions are reset to an initial state at the timing at which the readout voltage is applied to the readout electrodes corresponding to the first predetermined light receiving portions, and the accumulation of signal charges is started from the initial state.

Accordingly, the exposure period of the first predetermined light receiving portions corresponds to a period that continues from the timing at which the readout voltage is applied to the readout electrodes corresponding to the first predetermined light receiving portions to the closing time of a mechanical shutter.

According to the solid-state imaging device, the driving method thereof, and the imaging apparatus of the above-mentioned embodiments of the present invention, it is possible to obtain image signals with different exposure periods using the same readout sequence.

DESCRIPTION OF THE PREFERRED EMBODIMENTS

Hereinafter, modes for carrying out the present invention (hereinafter referred to as embodiments) will be described. The description will be given in the following order.

1. First Embodiment
2. Second Embodiment
3. Third Embodiment

1. First Embodiment

Configuration of Solid-State Imaging Device

Figure 1:
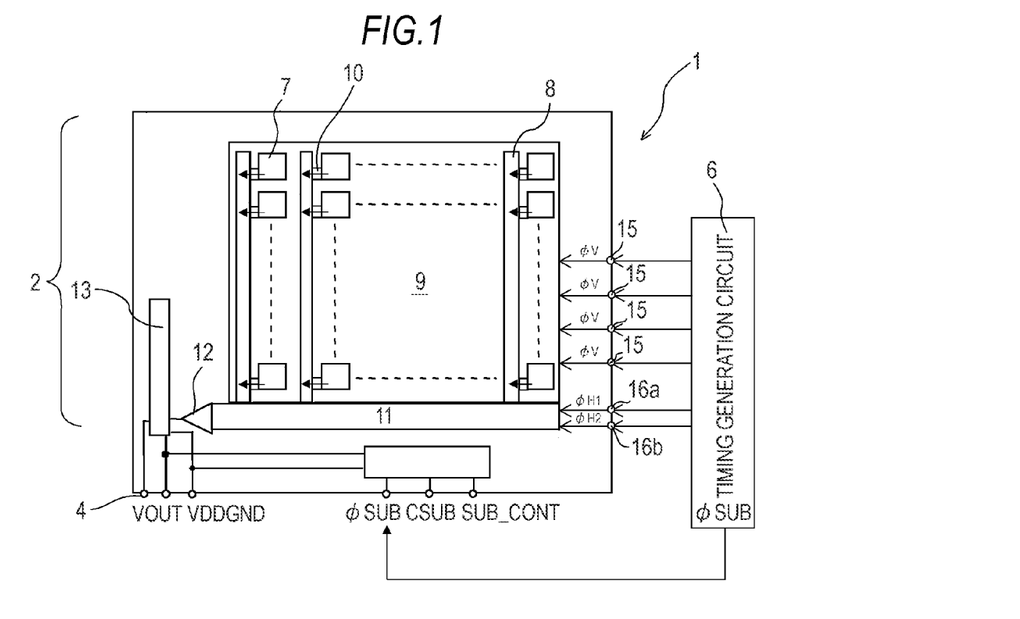
FIG. 1 is a schematic plan view illustrating a CCD solid-state imaging device which is an example of a solid-state imaging device according to an embodiment of the present invention.

FIG. 1 is a schematic plan view illustrating a CCD solid-state imaging device 1 which is an example of a solid-state imaging device according to an embodiment of the present invention. The CCD solid-state imaging device 1 illustrated herein mainly includes a CCD solid-state image sensor 2 and a timing generation circuit 6. The timing generation circuit 6 is an example of a controller.

CCD Solid-State Image Sensor

The CCD solid-state image sensor 2 includes an imaging area 9 which is formed with light receiving portions 7 and vertical transfer portions 8.

The light receiving portions 7 are arranged in row (vertical) and column (horizontal) directions to form a matrix and are configured to convert incident light to signal charges having an amount corresponding to the amount of the incident light and accumulate the signal charges therein. The light receiving portions 7 are configured from PN-junction photodiodes, for example. The signal charges accumulated in the light receiving portions 7 are read out to the vertical transfer portions 8 when a readout pulses (readout voltage) XSG described later is applied to readout electrodes (readout gates) 10.

The vertical transfer portions 8 are provided for each vertical column of the light receiving portions 7 and are driven by vertical transfer clocks φV. The vertical transfer portions 8 transfer sequentially the readout signal charges in the vertical direction so that signal charges corresponding to one scan line are transferred each horizontal blanking period.

The transfer electrodes of the vertical transfer portions 8 also serve as the readout electrodes (readout gates) 10. Due to this configuration, the vertical transfer clocks φV are configured to have the three values low level (L level), medium level (M level), and high level (H level). Among these multi-level pulses, pulses with high level (H level) are used as the readout pulses XSG which are applied to the readout gates 10.

In the lower part of the imaging area 9 in the figure, a horizontal transfer portion 11 is disposed. The horizontal transfer portion 11 is driven by two-phase horizontal transfer clocks φH1 and φH2, for example, and transfers sequentially one line of signal charges transferred from the plural lines of vertical transfer portions 8 in a horizontal scanning period subsequent to the horizontal blanking period.

A charge-to-voltage converter 12 which is configured by a floating diffusion amplifier, for example, is provided at an end of the horizontal transfer portion 11 on a transfer destination side thereof. The charge-to-voltage converter 12 converts sequentially the signal charges which are horizontally transferred by the horizontal transfer portion 11 to voltage signals and outputs the voltage signals.

The voltage signals converted by the charge-to-voltage converter 12 are passed to an output circuit 13 and are then output through an output terminal 4 to an external device as CCD outputs corresponding to the incident light from the subject.

The imaging area 9, the horizontal transfer portion 11, and the charge-to-voltage converter 12 are formed on a semiconductor substrate 14, whereby an interline transfer CCD solid-state image sensor is obtained.

Figure 2:
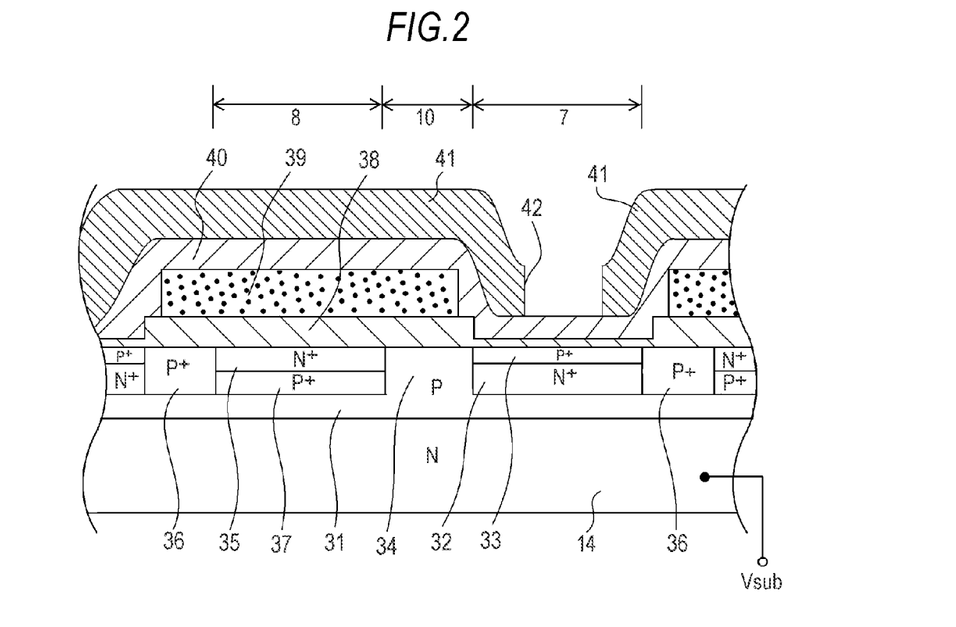
FIG. 2 is a schematic cross-sectional view illustrating a depth structure of a light receiving portion and a semiconductor substrate at the periphery of the light receiving portion.

Depth Structure of Light Receiving Portion and Semiconductor Substrate at Periphery Thereof FIG. 2 is a schematic cross-sectional view illustrating a depth structure of the light receiving portion 7 and the semiconductor substrate 14 at the periphery of the light receiving portion 7. In FIG. 2, a P-type well region 31 is formed on the surface of the semiconductor substrate 14 having N-type conductivity, for example, and an $N^+$-type signal charge accumulation region 32 is formed on the surface of the well region 31. Furthermore, a $P^+$-type hole accumulation region 33 is formed on the signal charge accumulation region 32, whereby the light receiving portion 7 with a so-called HAD (hole accumulation diode) is obtained.

The amount of signal charges accumulated in the light receiving portion 7 is determined by a potential barrier height of an overflow barrier (OFB) which is formed by the P-type well region 31. That is to say, the overflow barrier (OFB) determines a saturation signal amount Qs of the signal charges accumulated in the light receiving portion 7. When the accumulation charge amount exceeds the saturation signal amount Qs, an excessive part of the signal charges goes over the potential barrier and is swept out towards the semiconductor substrate 14.

In this way, the light receiving portion 7 with a so-called vertical overflow drain structure is obtained. In the vertical overflow drain structure, the semiconductor substrate 14 serves as an overflow drain.

In the light receiving portion 7, although the saturation signal amount Qs is determined by an S/N characteristic of a device, the amount of charges handled by the vertical transfer portions 11, and other factors, the potential of the overflow barrier OFB varies due to variations during the manufacturing process. The potential of the overflow barrier OFB can be controlled by an overflow drain bias, i.e., a substrate bias Vsub.

In a transverse direction of the light receiving portion 7, an $N^+$-type signal charge transfer region 35 and a $P^+$-type channel stop region 36 are formed via a P-type region 34 that constitutes the readout gate 10. A $P^+$-type impurity diffusion region 37 for preventing contamination by a smear component is formed under the signal charge transfer region 35. Furthermore, a transfer electrode 39 made of polycrystalline silicon, for example, is disposed over the signal charge transfer region 35 via a gate insulating film 38, whereby the vertical transfer portion 8 is obtained. The portion of the transfer electrode 39 positioned over the P-type region 34 also serves as the gate electrode of the readout gate 10.

An aluminum light shielding film 41 is formed over the vertical transfer portion 8 via an interlayer film 40 so as to cover the transfer electrode 39. The aluminum light shielding film 41 is removed, by etching, selectively in a portion corresponding to the light receiving portion 7 to form an opening 42, through which external light enters the light receiving portion 7. As described above, the substrate bias Vsub, which determines the amount of signal charges accumulated in the light receiving portion 7, i.e., determines the potential of the overflow barrier OFB, is applied to the semiconductor substrate 14.

Timing Generation Circuit

The timing generation circuit 6 generates the vertical transfer clocks φV and the two-phase horizontal transfer clocks φH1 and φH2 for driving the above-described CCD solid-state image sensor 2.

The vertical transfer clocks φV are supplied to the CCD solid-state image sensor 2 via a terminal 15 that is formed on the semiconductor substrate 14. The two-phase horizontal transfer clocks φH1 and φH2 are supplied to the CCD solid-state image sensor 2 via terminals 16*a* and 16*b* that are formed on the semiconductor substrate 14.

Furthermore, in addition to the vertical transfer clocks and the horizontal transfer clocks, the timing generation circuit 6 generates appropriately various timing signals such as shutter pulses φSUB for sweeping out the signal charges accumulated in the light receiving portion 7 to the semiconductor substrate 14.

Operation of Solid-State Imaging Device

Hereinafter, the operation of the solid-state imaging device having the above-described configuration will be described. That is, an example of a driving method of the solid-state imaging device according to the embodiment of the present invention will be described.

Acquisition of Voltage Signal with Different Exposure Periods

In the CCD solid-state imaging device 1 according to the embodiment of the present invention, a video image which is desired to be imaged as a still picture is first determined in a high-speed imaging period (monitoring mode) where a mechanical shutter is opened.

Next, when the video image to be imaged as a still picture is determined and a shutter (not shown) is pressed (the timing denoted by symbol t1 in FIG. 3), a plurality of shutter pulses φSUB is generated in that period corresponding to the pressing. By the application of these shutter pulses φSUB, the signal charges of the entirety of the light receiving portions 7 are swept out and discarded to the semiconductor substrate 14.

Subsequently, at the timing denoted by symbol t2 in FIG. 3, a readout pulse XSG is applied to the readout gates 10 of the light receiving portions 7 positioned on the (3N−2)th row (N: a natural number). By the application of the readout pulse XSG, the signal charges of the light receiving portions 7 positioned on the (3N−2)th row are read out to the vertical transfer portions 8. Here, the light receiving portions 7 positioned on the (3N−2)th row are an example of "first predetermined light receiving portions."

Figure 3:
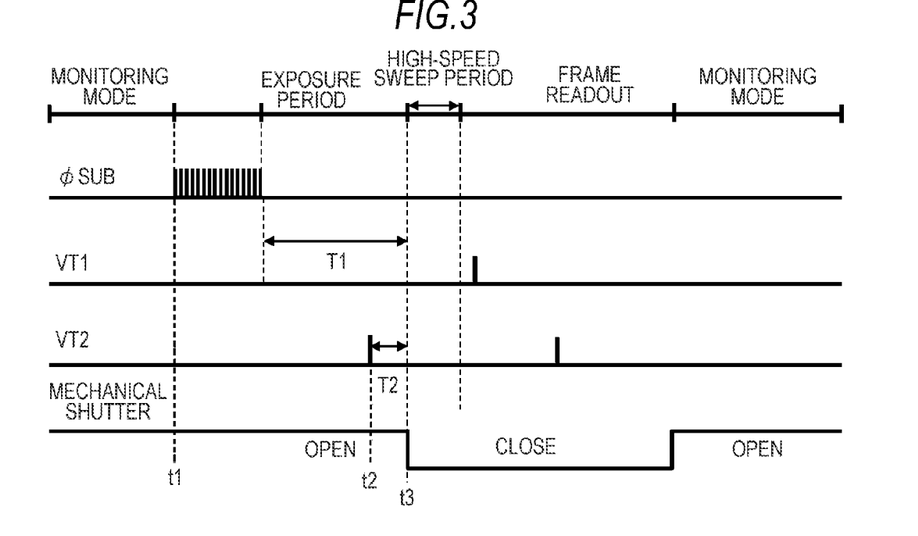
FIG. 3 is a timing chart illustrating an example of a driving method of the solid-state imaging device according to the embodiment of the present invention.

Thereafter, at the timing denoted by symbol t3 in FIG. 3, the mechanical shutter is closed, and the exposure period ends.

Here, since the signal charges of the light receiving portions 7 positioned on the (3N−2)th row are read out to the vertical transfer portions 8 at the timing denoted by symbol t2 in FIG. 3, the exposure period of the light receiving portions 7 positioned on the (3N−2)th row becomes identical to a period denoted by symbol T2 in FIG. 3.

That is to say, in a period denoted by symbol T1 in FIG. 3, light is incident on the light receiving portions 7 positioned on the (3N−2)th row. However, the signal charges accumulated by the light incident during a period that continues from the start timing of the exposure period to the timing denoted by symbol t2 in FIG. 3 are read out to the vertical transfer portions 8. Therefore, the signal charges accumulated in the light receiving portions 7 positioned on the (3N−2)th row at the timing denoted by symbol t3 in FIG. 3 are accumulated by the light incident in the period denoted by symbol T2 in FIG. 3. Accordingly, the exposure period of the light receiving portions 7 positioned on the (3N−2)th row is identical to the period denoted by symbol T2 in FIG. 3.

The exposure period of the light receiving portions 7 positioned on the (3N−1)th row and the 3N-th row corresponds to the period denoted by symbol T1 in FIG. 3.

Here, when the mechanical shutter is closed and the exposure period ends, a frame readout period is started in which the signal charges of the entirety of the light receiving portions 7 are read out by frame readout, for example.

In the frame readout period, the signal charges in the vertical transfer portions 8 are first swept out by high-speed transfer driving of the vertical transfer portions 8. With the high-speed transfer driving, the signal charges which have been read out from the light receiving portions 7 to the vertical transfer portions 8 at the timing denoted by symbol t2 in FIG. 3 can also be swept out.

By the above method, it is possible to obtain a voltage signal with the exposure period of T1 and a voltage signal with the exposure period of T2.

In the first embodiment, the case where the readout pulse XSG is applied to the readout gates 10 of the light receiving portions 7 positioned on the (3N−2)th row at the timing denoted by symbol t2 in FIG. 3 is described as an example. However, it is not always necessary to perform the readout operation on the light receiving portions 7 positioned on the (3N−2)th row, but the readout operation may be performed on arbitrary light receiving portions 7.

Acquisition of Image Signal with Exposure Period of T1

The voltage signals obtained by the above method have an exposure period of T1 for the light receiving portions 7 positioned on the (3N−1)th row and the 3N-th row and have an exposure period of T2 for the light receiving portions 7 positioned on the (3N−2)th row.

To acquire an image signal with the exposure period of T1, it is necessary to have voltage signals with the exposure period of T1, of the entirety of the light receiving portions 7. Therefore, it is necessary to calculate voltage signals with the exposure period of T1, of the light receiving portions 7 positioned on the (3N−2)th row.

Hereinafter, a calculation example of the voltage signals with the exposure period of T1, of the light receiving portions 7 positioned on the (3N−2)th row will be described.

Case 1: Voltage Signal with Exposure Period of T2 has Sufficient Signal Amount

Figure 4A:
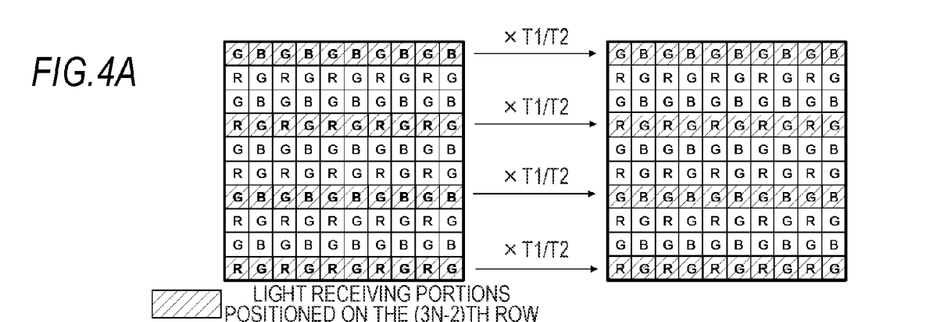
FIGS. 4A and 4B are first diagrams illustrating a calculation example of a voltage signal when an exposure period is T1.

By multiplying the voltage signals of the light receiving portions 7 positioned on the (3N−2)th row with T1/T2, it is possible to calculate the voltage signals with the exposure period of T1, of the light receiving portions 7 positioned on the (3N−2)th row (see FIG. 4A).

The symbols "R," "G," and "B" in FIG. 4A designate the colors "red," "green," and "blue" of a color filter.

Case 2: Voltage Signal with Exposure Period of T2 has Insufficient Signal Amount By using the voltage signals of the light receiving portions 7 positioned on the (3N−1)th row and the voltage signals of the light receiving portions 7 positioned on the 3N-th row, it is possible to calculate the voltage signals with the exposure period of T1, of the light receiving portions 7 positioned on the (3N−2)th row (see FIG. 4B).

Figure 4B:
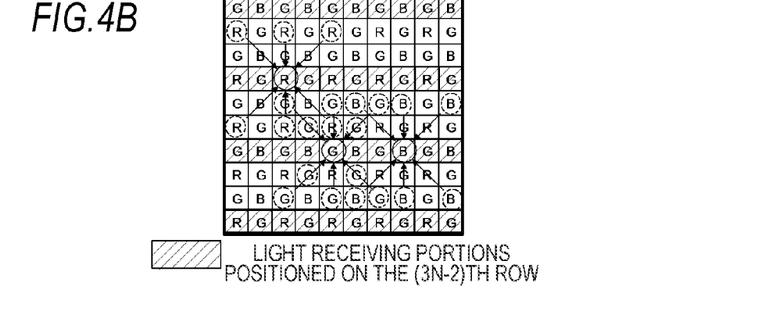

The symbols "R," "G," and "B" in FIG. 4B designate the colors "red," "green," and "blue" of a color filter. FIG. 4B illustrates that the voltage signals of the light receiving portions 7 denoted by solid circles are calculated based on the voltage signals of the light receiving portions 7 denoted by dotted circles.

By the above method, it is possible to obtain an image signal with the exposure period of T1, of the light receiving portions 7 positioned on the (3N−2)th row.

Acquisition of Image Signal Using Exposure Period T2

Similarly, to acquire an image signal with the exposure period of T2, it is necessary to have voltage signals with the exposure period of T2, of the entirety of the light receiving portions 7. Therefore, it is necessary to calculate the voltage signals with the exposure period of T2, of the light receiving portions 7 positioned on the (3N−1)th row and the 3N-th row.

Hereinafter, a calculation example of the voltage signals with the exposure period of T2, of the light receiving portions 7 positioned on the (3N−1)th row and the 3N-th row will be described.

Case 1: Voltage Signal with Exposure Period of T1 has Non-Saturated Signal Amount By multiplying the voltage signals of the light receiving portions 7 positioned on the (3N−1)th row with T2/T1, it is possible to calculate the voltage signals with the exposure period of T2, of the light receiving portions 7 positioned on the (3N−1)th row. Moreover, by multiplying the voltage signals of the light receiving portions 7 positioned on the 3N-th row with T2/T1, it is possible to calculate the voltage signals with the exposure period of T2, of the light receiving portions 7 positioned on the 3N-th row (see FIG. 5A).

Figure 5A:
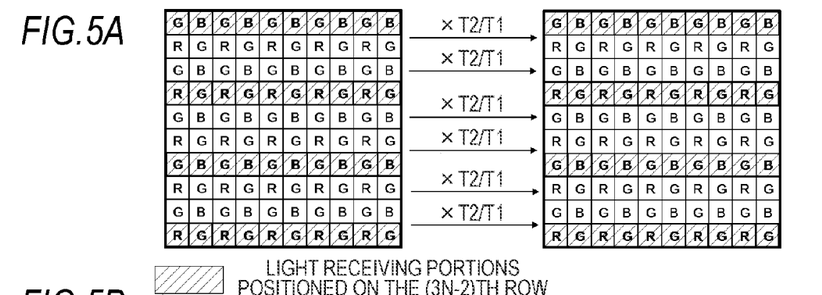
FIGS. 5A and 5B are diagrams illustrating a calculation example of a voltage signal when an exposure period is T2.

The symbols "R," "G," and "B" in FIG. 5A designate the colors "red," "green," and "blue" of a color filter.

Case 2: Voltage Signal with Exposure Period of T1 has Saturated Signal Amount

Figure 5B:
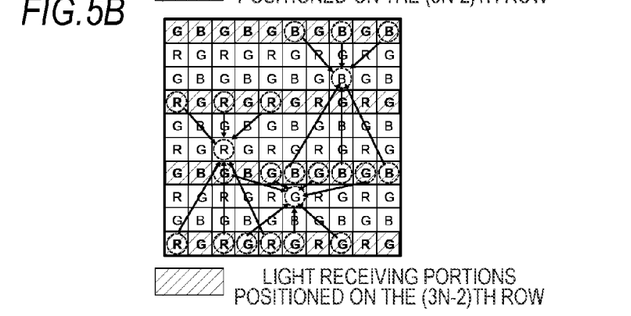

By using the voltage signals of the light receiving portions 7 positioned on the (3N−2)th row, it is possible to calculate the voltage signals with the exposure period of T2, of the light receiving portions 7 positioned on the (3N−1)th row and the light receiving portions 7 positioned on the 3N-th row (see FIG. 5B).

The symbols "R," "G," and "B" in FIG. 5B designate the colors "red," "green," and "blue" of a color filter. FIG. 5B illustrates that the voltage signals of the light receiving portions 7 denoted by solid circles are calculated based on the voltage signals of the light receiving portions 7 denoted by dotted circles.

By the above method, it is possible to obtain the image signal with the exposure period of T2, of the light receiving portions 7 positioned on the (3N−1)th row and the light receiving portions 7 positioned on the 3N-th row.

Subsequently, the image signal with the exposure period of T1 and the image signal with the exposure period of T2 are combined to obtain a combined image with a wide dynamic range, and a detailed method thereof will be described in a third embodiment described later.

According to the first embodiment of the present invention, it is possible to obtain image signals with different exposure periods using a single readout sequence. That is to say, no time offset occurs between the readout sequence of the image signal with the exposure period of T1 and the readout sequence of the image signal with the exposure period of T2. For this reason, the resolution of the combined image will not decrease even when a subject moves at a high speed or the exposure time is long.

Moreover, since the image signals with different exposure periods are obtained using a single readout sequence, it is possible to obtain appropriately images with a wide dynamic range even when a blinking subject is shot.

2. Second Embodiment

In the first embodiment described above, the case of obtaining two image signals with different exposure periods has been described as an example. However, the number of image signals being combined is not necessarily two, and three or more image signals with different exposure periods may be combined together. In the case of obtaining three or more image signals with different exposure periods, the configuration of the solid-state imaging device is the same as that used in the first embodiment described above.

Operation of Solid-State Imaging Device

Hereinafter, the operation of the solid-state imaging device of the case of obtaining three image signals with different exposure periods will be described. That is, another example of a driving method of the solid-state imaging device according to the embodiment of the present invention will be described.

Acquisition of Voltage Signal with Different Exposure Periods

In the case of obtaining three image signals with different exposure periods, similar to the first embodiment described above, a video image which is desired to be imaged as a still picture is determined in a high-speed imaging period (monitoring mode) where a mechanical shutter is opened.

Next, when the video image to be imaged as a still picture is determined and a shutter (not shown) is pressed (the timing denoted by symbol t1 in FIG. 6), a plurality of shutter pulses φSUB is generated in that period corresponding to the pressing. By the application of these shutter pulses φSUB, the signal charges of the entirety of the light receiving portions 7 are swept out and discarded to the semiconductor substrate 14.

Subsequently, at the timing denoted by symbol t2 in FIG. 6, a readout pulse XSG is applied to the readout gates 10 of the light receiving portions 7 positioned on the (3N−2) th row (N: a natural number). By the application of the readout pulse XSG, the signal charges of the light receiving portions 7 positioned on the (3N−2) th row are read out to the vertical transfer portions 8. Here, the light receiving portions 7 positioned on the (3N−2)th row are an example of "first predetermined light receiving portions."

Figure 6:
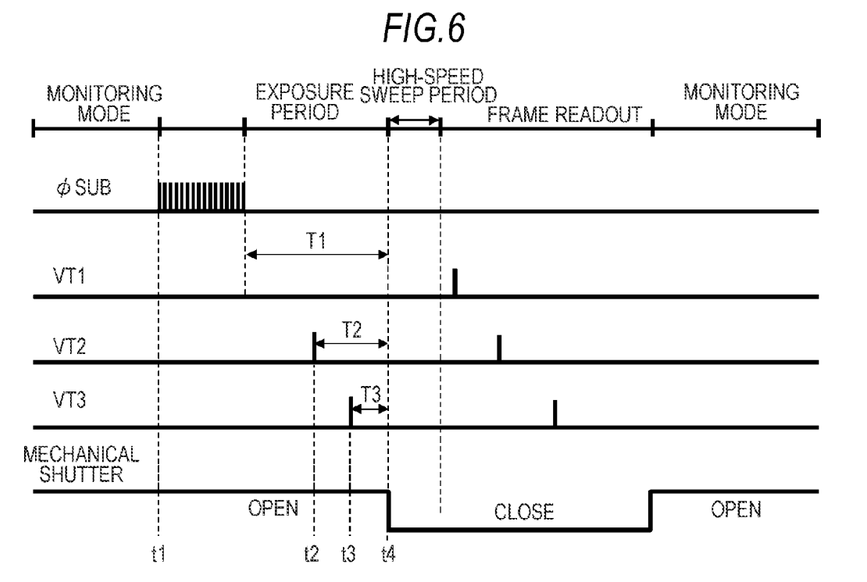
FIG. 6 is a timing chart illustrating another example of a driving method of the still image data according to the embodiment of the present invention.

Furthermore, at the timing denoted by symbol t3 in FIG. 6, a readout pulse XSG is applied to the readout gates 10 of the light receiving portions 7 positioned on the 3N-th row. By the application of the readout pulse XSG, the signal charges of the light receiving portions 7 positioned on the 3N-th row are read out to the vertical transfer portions 8. Here, the light receiving portions 7 positioned on the 3N-th row are an example of "second predetermined light receiving portions."

Thereafter, at the timing denoted by symbol t4 in FIG. 6, the mechanical shutter is closed, and the exposure period ends.

Here, since the signal charges of the light receiving portions 7 positioned on the (3N−2)th row are read out to the vertical transfer portions 8 at the timing denoted by symbol t2 in FIG. 6, the exposure period of the light receiving portions 7 positioned on the (3N−2)th row becomes identical to a period denoted by symbol T2 in FIG. 6.

That is to say, in a period denoted by symbol T1 in FIG. 6, light is incident on the light receiving portions 7 positioned on the (3N−2)th row. However, the signal charges accumulated by the light incident during a period that continues from the start timing of the exposure period to the timing denoted by symbol t2 in FIG. 6 are read out to the vertical transfer portions 8. Therefore, the signal charges accumulated in the light receiving portions 7 positioned on the (3N−2)th row at the timing denoted by symbol t4 in FIG. 6 are accumulated by the light incident in the period denoted by symbol T2 in FIG. 6. Accordingly, the exposure period of the light receiving portions 7 positioned on the (3N−2)th row is identical to the period denoted by symbol T2 in FIG. 6.

Moreover, since the signal charges of the light receiving portions 7 positioned on the 3N-th row are read out to the vertical transfer portions 8 at the timing denoted by symbol t3 in FIG. 6, the exposure period of the light receiving portions 7 positioned on the 3N-th row becomes identical to a period denoted by symbol T3 in FIG. 6.

That is to say, in a period denoted by symbol T1 in FIG. 6, light is incident on the light receiving portions 7 positioned on the 3N-th row. However, the signal charges accumulated by the light incident during a period that continues from the start timing of the exposure period to the timing denoted by symbol t3 in FIG. 6 are read out to the vertical transfer portions 8. Therefore, the signal charges accumulated in the light receiving portions 7 positioned on the 3N-th row at the timing denoted by symbol t4 in FIG. 6 are accumulated by the light incident in the period denoted by symbol T3 in FIG. 6. Accordingly, the exposure period of the light receiving portions 7 positioned on the 3N-th row is identical to the period denoted by symbol T3 in FIG. 6.

The exposure period of the light receiving portions 7 positioned on the (3N−1)th row corresponds to the period denoted by symbol T1 in FIG. 6.

Here, when the mechanical shutter is closed and the exposure period ends, a frame readout period is started in which the signal charges of the entirety of the light receiving portions 7 are read out by frame readout, for example.

In the frame readout period, the signal charges in the vertical transfer portions 8 are first swept out by high-speed transfer driving of the vertical transfer portions 8. With the high-speed transfer driving, the signal charges which have been read out from the light receiving portions 7 to the vertical transfer portions 8 at the timing denoted by symbol t2 in FIG. 6 and the timing denoted by symbol t3 in FIG. 6 can also be swept out.

By the above method, it is possible to obtain a voltage signal with the exposure period of T1, a voltage signal with the exposure period of T2, and a voltage signal with the exposure period of T3.

In the second embodiment, the case where the readout pulse XSG is applied to the readout gates 10 of the light receiving portions 7 positioned on the (3N−2)th row at the timing denoted by symbol t2 in FIG. 6 is described as an example. Moreover, in the second embodiment, the case where the readout pulse XSG is applied to the readout gates 10 of the light receiving portions 7 positioned on the 3N-th row at the timing denoted by symbol t3 in FIG. 6 is described as an example. However, it is not always necessary to perform the readout operation on the light receiving portions 7 positioned on the (3N−2)th row at the timing denoted by symbol t2 in FIG. 6, but the readout operation may be performed on arbitrary light receiving portions 7. Similarly, it is not always necessary to perform the readout operation on the light receiving portions 7 positioned on the 3N-th row at the timing denoted by symbol t3 in FIG. 6, but the readout operation may be performed on arbitrary light receiving portions 7. However, it is necessary to ensure that the light receiving portions 7 in which the readout operation is performed at the timing denoted by t2 in FIG. 6 are different from the light receiving portions 7 in which the readout operation is performed at the timing denoted by symbol t3 in FIG. 6.

Acquisition of Image Signal with Exposure Period of T1

The voltage signals obtained by the above method have an exposure period of T1 for the light receiving portions 7 positioned on the (3N−1)th row and have an exposure period of T2 for the light receiving portions 7 positioned on the (3N−2)th row. In addition, the voltage signals have an exposure period of T3 for the light receiving portions 7 positioned on the 3N-th row. To acquire an image signal with the exposure period of T1, it is necessary to have voltage signals with the exposure period of T1, of the entirety of the light receiving portions 7. Therefore, it is necessary to calculate voltage signals with the exposure period of T1, of the light receiving portions 7 positioned on the (3N−2)th row and the 3N-th row.

Hereinafter, a calculation example of the voltage signals with the exposure period of T1, of the light receiving portions 7 positioned on the (3N−2)th row and the 3N-th row will be described.

Case 1: Voltage Signal with Exposure Periods of T2 and T3 has Sufficient Signal Amount By multiplying the voltage signals of the light receiving portions 7 positioned on the (3N−2)th row with T1/T2, it is possible to calculate the voltage signals with the exposure period of T1, of the light receiving portions 7 positioned on the (3N−2)th row. Moreover, by multiplying the voltage signals of the light receiving portions 7 positioned on the 3N-th row with T1/T3, it is possible to calculate the voltage signals with the exposure period of T1, of the light receiving portions 7 positioned on the 3N-th row (see FIG. 7A).

Figure 7A:
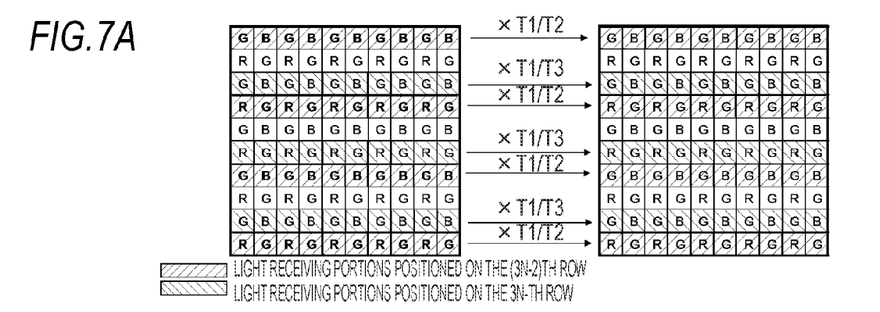
FIGS. 7A and 7B are second diagrams illustrating a calculation example of a voltage signal when an exposure period is T1.

The symbols "R," "G," and "B" in FIG. 7A designate the colors "red," "green," and "blue" of a color filter.

Case 2: Voltage Signal with Exposure Periods of T2 and T3 has Insufficient Signal Amount By using the voltage signals of the light receiving portions 7 positioned on the (3N−1)th row, it is possible to calculate the voltage signals with the exposure period of T1, of the light receiving portions 7 positioned on the (3N−2)th row and the light receiving portion 7 positioned on the 3N-th row (see FIG. 7B).

Figure 7B:
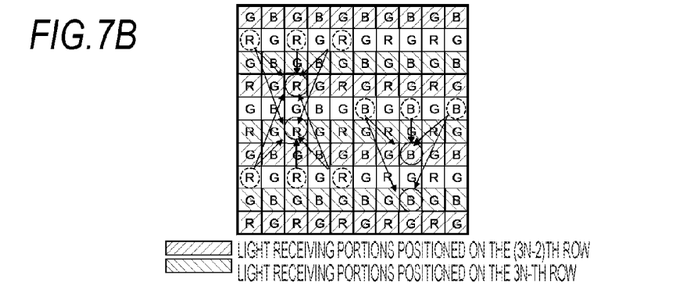

The symbols "R," "G," and "B" in FIG. 7B designate the colors "red," "green," and "blue" of a color filter. FIG. 7B illustrates that the voltage signals of the light receiving portions 7 denoted by solid circles are calculated based on the voltage signals of the light receiving portions 7 denoted by dotted circles.

By the above method, it is possible to obtain an image signal with the exposure period of T1, of the light receiving portions 7 positioned on the (3N−2)th row and the 3N-th row.

Acquisition of Image Signal Using Exposure Period T2

Similarly, to acquire an image signal with the exposure period of T2, it is necessary to have voltage signals with the exposure period of T2, of the entirety of the light receiving portions 7. Therefore, it is necessary to calculate the voltage signals with the exposure period of T2, of the light receiving portions 7 positioned on the (3N−1)th row and the 3N-th row.

Hereinafter, a calculation example of the voltage signals with the exposure period of T2, of the light receiving portions 7 positioned on the (3N−1)th row and the 3N-th row will be described.

Case 1: Voltage Signal with Exposure Period of T1 has Non-Saturated Signal Amount; and Voltage Signal with Exposure Period of T3 has Sufficient Signal Amount By multiplying the voltage signals of the light receiving portions 7 positioned on the (3N−1)th row with T2/T1, it is possible to calculate the voltage signals with the exposure period of T2, of the light receiving portions 7 positioned on the (3N−1)th row. Moreover, by multiplying the voltage signals of the light receiving portions 7 positioned on the 3N-th row with T2/T3, it is possible to calculate the voltage signals with the exposure period of T2, of the light receiving portions 7 positioned on the 3N-th row.

Case 2: Voltage Signal with Exposure Period of T1 has Non-Saturated Signal Amount; and Voltage Signal with Exposure Period of T3 has Insufficient Signal Amount By multiplying the voltage signals of the light receiving portions 7 positioned on the (3N−1)th row with T2/T1, it is possible to calculate the voltage signals with the exposure period of T2, of the light receiving portions 7 positioned on the (3N−1)th row. Moreover, by using the voltage signals of the light receiving portions 7 positioned on the (3N−2)th row and the voltage signals of the light receiving portions 7 positioned on the (3N−1) th row, it is possible to calculate the voltage signals with the exposure period of T2, of the light receiving portions 7 positioned on the 3N-th row.

Case 3: Voltage Signal with Exposure Period of T1 has Saturated Signal Amount; and Voltage Signal with Exposure Period of T3 has Sufficient Signal Amount By using the voltage signals of the light receiving portions 7 positioned on the (3N−2)th row and the voltage signals of the light receiving portions 7 positioned on the 3N-th row, it is possible to calculate the voltage signals with the exposure period of T2, of the light receiving portions 7 positioned on the (3N−1) th row. Moreover, by multiplying the voltage signals of the light receiving portions 7 positioned on the 3N-th row with T2/T3, it is possible to calculate the voltage signals with the exposure period of T2, of the light receiving portions 7 positioned on the 3N-th row.

Case 4: Voltage Signal with Exposure Period of T1 has Saturated Signal Amount; and Voltage Signal with Exposure Period of T3 has Insufficient Signal Amount By using the voltage signals of the light receiving portions 7 positioned on the (3N−2)th row, it is possible to calculate the voltage signals with the exposure period of T2, of the light receiving portions 7 positioned on the (3N−1)th row and the light receiving portions 7 positioned on the 3N-th row.

By the above method, it is possible to obtain the image signal with the exposure period of T2, of the light receiving portions 7 positioned on the (3N−1)th row and the light receiving portions 7 positioned on the 3N-th row.

Acquisition of Image Signal Using Exposure Period T3

Similarly, to acquire an image signal with the exposure period of T3, it is necessary to have voltage signals with the exposure period of T3, of the entirety of the light receiving portions 7. Therefore, it is necessary to calculate the voltage signals with the exposure period of T3, of the light receiving portions 7 positioned on the (3N−2)th row and the (3N−1)th row.

Hereinafter, a calculation example of the voltage signals with the exposure period of T3, of the light receiving portions 7 positioned on the (3N−2)th row and the (3N−1)th row will be described.

Case 1: Voltage Signal with Exposure Period of T1 has Non-Saturated Signal Amount; and Voltage Signal with Exposure Period of T2 has Sufficient Signal Amount By multiplying the voltage signals of the light receiving portions 7 positioned on the (3N−2)th row with T3/T2, it is possible to calculate the voltage signals with the exposure period of T3, of the light receiving portions 7 positioned on the (3N−2)th row. Moreover, by multiplying the voltage signals of the light receiving portions 7 positioned on the (3N−1) th row with T3/T1, it is possible to calculate the voltage signals with the exposure period of T3, of the light receiving portions 7 positioned on the (3N−1)th row.

Case 2: Voltage Signal with Exposure Period of T1 has Non-Saturated Signal Amount; and Voltage Signal with Exposure Period of T2 has Insufficient Signal Amount By multiplying the voltage signals of the light receiving portions 7 positioned on the (3N−1)th row with T3/T1, it is possible to calculate the voltage signals with the exposure period of T3, of the light receiving portions 7 positioned on the (3N−1)th row. Moreover, by using the voltage signals of the light receiving portions 7 positioned on the (3N−1)th row and the voltage signals of the light receiving portions 7 positioned on the 3N-th row, it is possible to calculate the voltage signals with the exposure period of T3, of the light receiving portions 7 positioned on the (3N−2)th row.

Case 3: Voltage Signal with Exposure Period of T1 has Saturated Signal Amount; and Voltage Signal with Exposure Period of T2 has Sufficient Signal Amount By using the voltage signals of the light receiving portions 7 positioned on the (3N−2)th row and the voltage signals of the light receiving portions 7 positioned on the 3N-th row, it is possible to calculate the voltage signals with the exposure period of T3, of the light receiving portions 7 positioned on the (3N−1)th row. Moreover, by multiplying the voltage signals of the light receiving portions 7 positioned on the (3N−2)th row with T3/T2, it is possible to calculate the voltage signals with the exposure period of T3, of the light receiving portions 7 positioned on the (3N−2)th row.

By the above method, it is possible to obtain the image signal with the exposure period of T3, of the light receiving portions 7 positioned on the (3N−2) th row and the (3N−1) th row.

Subsequently, the image signal with the exposure period of T1, the image signal with the exposure period of T2, and the image signal with the exposure period of T3 are combined to obtain a combined image with a wide dynamic range, and a detailed method thereof will be described in a third embodiment described later.

According to the second embodiment of the present invention, it is possible to obtain image signals with different exposure periods using a single readout sequence. That is to say, no time offset occurs between the readout sequence of the image signal with the exposure period of T1, the readout sequence of the image signal with the exposure period of T2, and the readout sequence of the image signal with the exposure period of T3. For this reason, the resolution of the combined image will not decrease even when a subject moves at a high speed or the exposure time is long.

Moreover, since the image signals with different exposure periods are obtained using a single readout sequence, it is possible to obtain appropriately images with a wide dynamic range even when a blinking subject is shot.

3. Third Embodiment

Configuration of Wide D Camera

Figure 8:
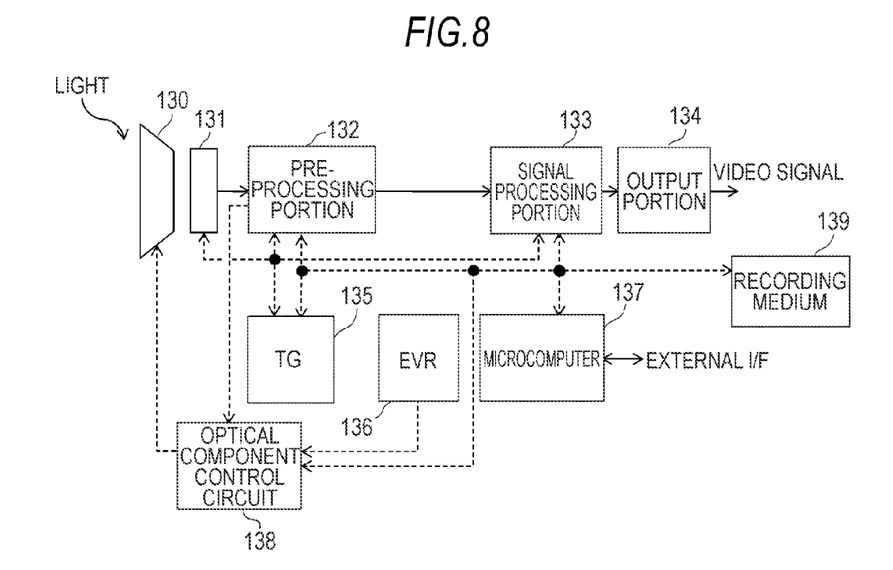
FIG. 8 is a block diagram illustrating a general configuration of a wide dynamic range camera which is an example of an imaging apparatus according to an embodiment of the present invention.

FIG. 8 is a block diagram illustrating a general configuration of a wide dynamic range camera (hereinafter referred to as a "wide D camera") which is an example of an imaging apparatus according to an embodiment of the present invention.

The wide D camera illustrated in FIG. 8 includes an optical component 130, an image sensor 131, a pre-processing portion 132, a signal processing portion 133, an output portion 134, a TG 135, an EVR 136, a microcomputer 137, an optical component control circuit 138, and a recording medium 139.

The optical component 130 is a lens or an optical filter that removes unnecessary wavelength components, and may be an ND (neutral density) filter, for example, which is a light-intensity adjustment filter. Light which has been incident from a subject and has passed through the optical component 130 is captured by the image sensor 131 and is then converted to electrical signals. Moreover, the optical component 130 is controlled by the microcomputer (micom) 137 via the optical component control circuit 138 so that the iris of a lens and the like are controlled, for example.

As the image sensor (imaging device) 131, the CCD solid-state image sensor 2 in the first embodiment is used.

The pre-processing portion 132 receives image signals output from the image sensor 131 and takes out a video signal from the image signals while reducing noise by the processing of a CDS (correlated double sampling) circuit. Furthermore, the pre-processing portion 132 gives a gain to the video signal to amplify (control the gain of) the video signal to a suitable signal level as necessary, and transmits the video signal to the signal processing portion 133.

The main noise of the CCD solid-state image sensor which is the image sensor 131 may include, for example, transfer noise, noise of an output amplifier, reset noise, noise caused by dark current, and light shot noise. The reset noise is noise produced when the floating diffusion of the CCD solid-state image sensor is reset, and the above-mentioned CDS circuit makes it possible to reduce the reset noise.

The signal processing portion 133 is made of two major blocks. One is a signal pre-processing block 140, and the other is a signal post-processing block (not shown).

The signal pre-processing block 140 performs processes of extracting a plurality of input image signals with different exposure periods (the image signal with the exposure period of T1 and the image signal with the exposure period of T2), correcting the color balance between the image signals with different exposure periods, and combining the image signals with different exposure periods together. The signal pre-processing block 140 will be described later in detail.

The signal post-processing block performs color processing such as aperture processing for performing γ (gamma) correction and contour correction, and white balance for adjusting color temperature based on "white" contained in a subject.

Furthermore, the signal processing portion 133 has at least a detecting portion 143 and is capable of detecting level information such as a luminance signal level, color information or the like of an image signal being input at the present point in time. The signal processing portion 133 is capable of adjusting white balance based on the detected information. The detection portion 143 will be described later in detail.

The output portion 134 receives the video signal from the signal processing portion 133 after the voltage signal is processed by the signal processing portion 133, and outputs a video image to a monitor of a display device, for example.

The TG (timing generator) 135 generates various pulses of the same kind as the timing generation circuit in the first embodiment.

The EVR (electronic volume) 136 is a variable resistor, the resistance value of which can be adjusted by digital signals or the like, and controls the optical component control circuit 138 and the like by varying the resistance value. Accordingly, the iris of a lens which is the optical component 130 can be adjusted by the EVR 136 and the like. In addition, the EVR 136 has storage means such as a memory, and is able to hold a changed resistance value even when power is turned off.

The optical component control circuit 138 has control means (not shown) for performing control such as iris adjustment of the optical component 130.

The microcomputer 137 controls the processing of the pre-processing portion 132, the signal processing portion 133, the TG 135, the EVR 136, and the optical component control circuit 138 on the basis of, for example, the detection result of the detecting portion 143. In addition, the microcomputer 137 determines compression gains and the like for combining and compressing the image signal with the exposure period of T1 and the image signal with the exposure period of T2.

Furthermore, the microcomputer 137 is able to control the wide D camera by transmitting/receiving, for example, control data for controlling the apparatus to/from an external device of the wide D camera via an external interface (I/F).

The external I/F may be, for example, the Ethernet (registered trademark) such as 10Base-T or 10Base-2, EIA-232, EIA-485, and the like.

The recording medium 139 is capable of storing, for example, control data necessary for controlling each portion of the wide D camera, adjustment data for adjusting exposure of a subject, user setting data such as color correction and AE which may be variously set by users of the wide D camera.

The recording medium 139 may be, for example, a ROM which is able to store data by writing data thereto, and an EEPROM (electrically erasable and programmable ROM) which is able to store or erase data by electrical erasure.

Detailed Description of Signal Pre-Processing Block

Figure 9:
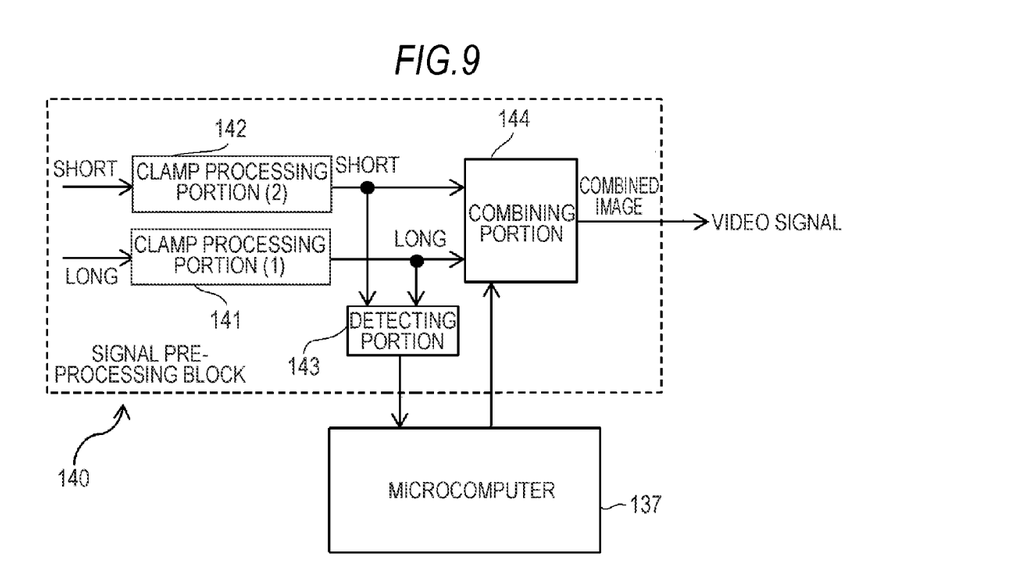
FIG. 9 is a block diagram illustrating a general configuration of a signal pre-processing block.

Next, with reference to FIG. 9, the signal pre-processing block 140 included in the signal processing portion 133 will be described. FIG. 9 is a block diagram illustrating a general configuration of the signal pre-processing block 140.

As illustrated in FIG. 9, the signal pre-processing block 140 includes a clamp processing portion (1) 141, a clamp processing portion (2) 142, a detecting portion 143, and a combining portion 144.

First, a long-exposure image signal is transmitted to the clamp processing portion (1) 141, and a short-exposure image signal is transmitted to the clamp processing portion (2) 142. Here, the "long-exposure image signal" is a signal containing a long-exposure image (long) imaged by the image sensor 131, and the short-exposure image signal" is a signal containing a short-exposure image (short) imaged by the image sensor 131.

The "long-exposure image signal" corresponds to the "image signal with the exposure period of T1" in the first embodiment, and the "short-exposure image signal" corresponds to the "image signal with the exposure period of T2" in the first embodiment.

Then, the clamp processing portion (1) 141 and the clamp processing portion (2) 142 determine a "0 level (black level)" reference from the luminance signal levels of the long-exposure image and the short-exposure image (clamp processing). After the 0 level is determined, the clamp processing portion (1) 141 and the clamp processing portion (2) 142 output the long-exposure image and the short-exposure image, respectively, to the combining portion 144 and the detecting portion 143.

The clamp processing portion (1) 141 and the clamp processing portion (2) 142 reproduces the direct-current components, remove low-frequency noise components, and determine where the 0 level is, by making use of the fact that the long-exposure image signal and the short-exposure image signal have periodicity. In composite video signals and luminance signals, black levels are used as references, and direct-current voltage values represent information. Accordingly, in signal processing, the black levels (0 level) are fixed, and the processing is performed based on these levels.

The detecting portion 143 detects the signal amount and the luminance signal level of the long-exposure image signal and the short-exposure image signal which are output from the clamp processing portion (1) 141 and the clamp processing portion (2) 142, respectively. The luminance signal level (luminance level) indicates the degree of brightness.

Here, the detection result of the detecting portion 143 is output to each portion such as the microcomputer 137, whereby each portion becomes able to execute processing.

In particular, the microcomputer 137 has to determine a switch point for combining the long-exposure image and the short-exposure image. For this reason, the detecting portion 143 detects the signal amounts or the distribution of the luminance signal levels (a histogram of the luminance signal levels) of the long-exposure image and the short-exposure image input thereto.

The combining portion 144 performs level adjustment on the exposure levels of the long-exposure image and the short-exposure image input thereto and combines them into one image by performing switching processing in units of pixels. The generated combined image is output as a combined image signal. The combining processing of the combining portion 144 on the long-exposure image and the short-exposure image will be described later in detail.

The microcomputer 137 is able to receive the signal amounts or the histograms of the luminance signal levels which are detected from the long-exposure image signal and the short-exposure image signal by the detecting portion 143. In addition, an average luminance signal level and the like of a high luminance region or a low-middle luminance region is calculated from the signal amounts of the luminance signal levels.

The microcomputer 137 adjusts the exposure of the long-exposure image and the short-exposure image based on information such as the detection result acquired from the detecting portion 143. Moreover, the microcomputer 137 corrects the proportion of a high luminance dynamic range and a low-middle luminance dynamic range in the dynamic range of an output image to be output as a video signal. Furthermore, the microcomputer 137 determines the switch point for combining the long-exposure image and the short-exposure image. The switch point is transmitted to each processing portion of the signal pre-processing block 140 by the microcomputer 137.

Image Output Operation

Hereinafter, an image output operation of the wide D camera having the above-described configuration will be described.

Imaging Process (S160)

Figure 10:
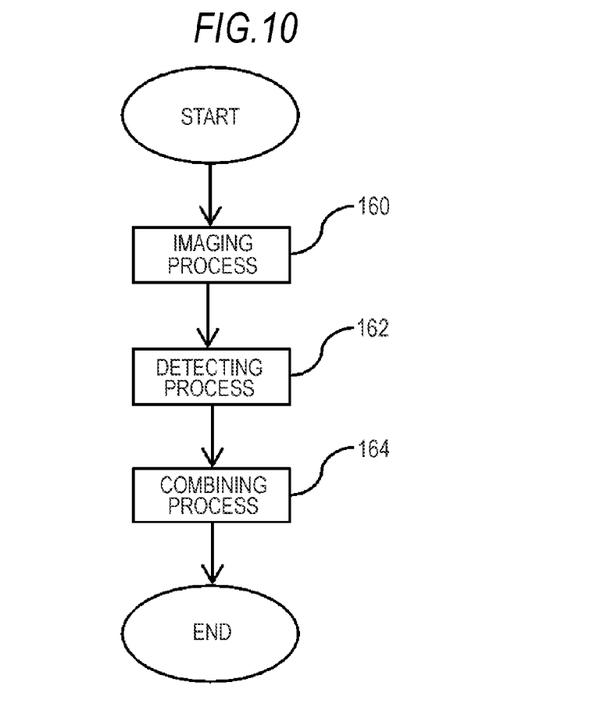
FIG. 10 is a diagram illustrating an image output operation of a wide D camera.

First, as illustrated in FIG. 10, an imaging apparatus which is a wide D camera performs an imaging process (S160) on a subject by means of the image sensor 131. Specifically, the imaging process is performed in accordance with the flow described in connection with the "Operation of Solid-State Imaging Device" in the first embodiment.

When the imaging process is completed, the long-exposure image and the short-exposure image which have been output from the image sensor 131 and subjected to, for example, CDS processing by the pre-processing portion 132 are transmitted to the signal pre-processing block 140 of the signal processing portion 133.

Detecting Process (S162)

In the signal pre-processing block 140, after the long-exposure image and the short-exposure image are subjected to clamp processing in the clamp processing portion (1) 141 and the clamp processing portion (2) 142, respectively, the processed long-exposure image and short-exposure image are transmitted to the detecting portion 143 and the combining portion 144.

When the long-exposure image and the short-exposure image are transmitted to the detecting portion 144, the detecting portion 144 performs a detecting process (S162) on the long-exposure image and the short-exposure image.

Based on the detection result in the detecting process, the microcomputer 137 determines La (switch luminance signal level) indicative of the highest luminance signal level in the low-middle luminance region of the long-exposure image. Moreover, the microcomputer 137 determines Lb indicative of the highest luminance signal level in the high luminance region of the short-exposure image.

Combining Process (S164)

When the detecting process is completed, the combining portion 144 performs a combining process (S164) on the long-exposure image and the short-exposure image to generate a combined image. The combining portion 144 performs the combining process based on information, such as La, transmitted from the microcomputer 137.

The combining process according to the third embodiment performs switching based on the switch point so as to adopt pixels corresponding to the luminance signal levels of the long-exposure image as to luminance signal levels lower than the switch point. When the input luminance signal level exceeds the switch point, the switching is performed so as to adopt pixels corresponding to the luminance signal levels of the short-exposure image.

That is to say, the image to be adopted as a combined image is switched in units of pixels from the long-exposure image to the short-exposure image at the switch point, whereby one combined image is obtained.

Hereinafter, the switch point according to the third embodiment will be described with reference to FIG. 11.

Figure 11:
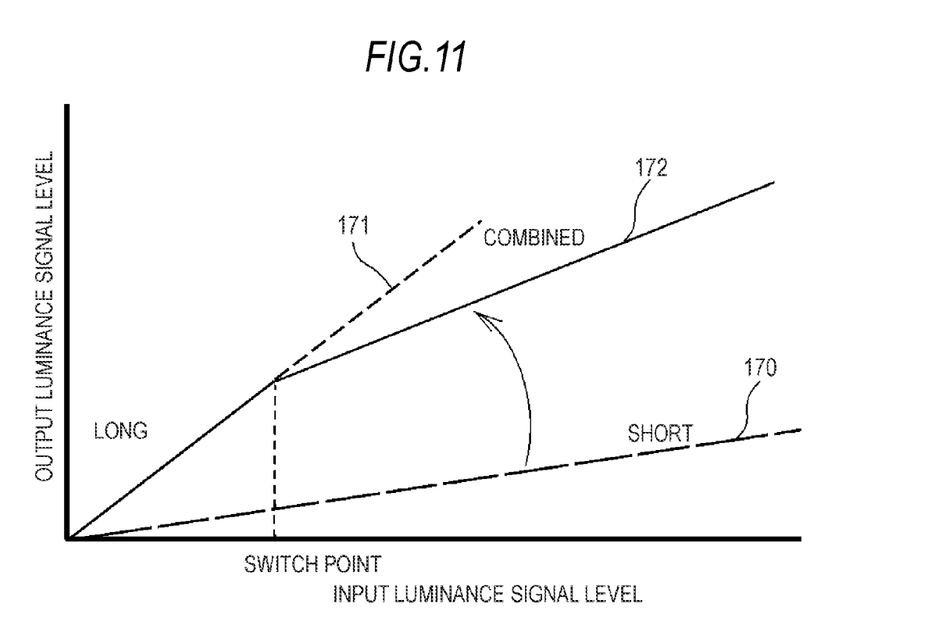
FIG. 11 is a diagram illustrating a switch point.

As illustrated in FIG. 11, the input/output characteristic of the short-exposure image is depicted as a short input/output characteristic 170, the input/output characteristic of the long-exposure image is depicted as a long input/output characteristic 171, and the input/output characteristic of the output image output from the signal processing portion 133 as the video signal is depicted as an output-image input/output characteristic 172. The horizontal axis shown in FIG. 11 represents the input luminance signal level of the image signal input to the combining portion 144, and the vertical axis represents the output luminance signal level of the image signal output from the combining portion 144.

First, for combining, the exposure ratio of the long-exposure image to the short-exposure image is multiplied by the short-exposure image, whereby the levels of both images are adjusted. For example, if the exposure ratio of the long-exposure image to the short-exposure image is 10:1, the exposure period of the short-exposure image is one-tenth of the long-exposure image. However, the amount of existing light is ten times the luminance signal level of the short-exposure image. Accordingly, the levels are adjusted by multiplying the short-exposure image by 10.

Accordingly, the inclination of the short input/output characteristic 170 moves in the direction indicated by the arrow shown in FIG. 11, so that the level of the short input/output characteristic 170 coincides with that of the long input/output characteristic 171. Furthermore, the short input/output characteristic 170 is inclined based on an appropriate switch point by the amount of a predetermined inclination, whereby the output-image input/output characteristic 172 is obtained.

The predetermined inclination is stored in, for example, the recording medium 139, and the microcomputer 137 performs the processing of inclining the short input/output characteristic 171, the level of which is adjusted by the above-mentioned multiplication, by the amount of the predetermined inclination. The reason why the short input/output characteristic 171 is inclined by the above-mentioned amount of inclination is to prevent the dynamic range from becoming too wide and prevent noise such as image distortion.

When the above-mentioned level adjustment of both images is completed, pixels to be adopted as a combined image are switched from the long-exposure image to the short-exposure image based on the switch point shown in FIG. 11, whereby the images are combined into one combined image.

When the combining process (S164) is completed, the combining portion 144 transmits the output image to the signal post-processing block as the video signal and a series of image output operations ends.

In the third embodiment of the present invention, the long-exposure image and the short-exposure image are obtained in the same manner as the first embodiment. Therefore, it is possible to obtain image signals with different exposure periods using a single readout sequence, and thus no time offset occurs between the long-exposure image and the short-exposure image. For this reason, the resolution of the output image obtained through the combining process will not decrease. In addition, it is possible to obtain appropriately images with a wide dynamic range even when a blinking subject is shot.

Moreover, since it is possible to obtain image signals with different exposure periods using a single readout sequence, it is not necessary to perform a synchronization process on the long-exposure image signal and the short-exposure image signal. Thus, it is possible to simplify the image output operation of the wide D camera.

That is to say, when readout sequences with different timings are performed at the time of obtaining image signals with different exposure periods, it is necessary to adjust (synchronize) the timings of the long-exposure image signal and the short-exposure image signal which are transmitted to the pre-processing portion 132 to a synchronized timing. This means that the image output operation of the wide D camera requires a synchronization process.

Therefore, since image signals with different exposure periods can be obtained using a single readout sequence, the synchronization process is not necessary. Accordingly, it is possible to simplify the image output operation of the wide D camera.

The present application contains subject matter related to that disclosed in Japanese Priority Patent Applications JP 2009-028773 and JP 2009-132688 filed in the Japan Patent Office on Feb. 10, 2009 and Jun. 2, 2009, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
light receiving portions that accumulate signal charges corresponding to incident light, the light receiving portions comprising first predetermined light receiving portions and second predetermined light receiving portions, wherein the first predetermined light receiving portions include no more than one-third of a total number of light receiving portions of the solid-state imaging device;
charge transfer portions that are formed to be adjacent to the light receiving portions so as to transfer the signal charges read out from the light receiving portions;
readout electrodes to which a readout voltage for reading out the signal charges accumulated in the light receiving portions to the charge transfer portions is applied; and
a controller that is configured to apply a first readout voltage to the readout electrodes corresponding to the first predetermined light receiving portions during an exposure period and while the signal charges are accumulated in the first predetermined light receiving portions and the second predetermined light receiving portions, wherein an exposure period associated with each of the first predetermined light receiving portions and the second predetermined light receiving portions terminate at a same time such that the signal charges of the first predetermined light receiving portions and the second predetermined light receiving portions having exposure periods different from one another are subjected to a readout sequence at a same time.

2. A solid-state imaging device comprising:
light receiving portions that are arranged in a matrix form so as to accumulate signal charges corresponding to incident light, the light receiving portions comprising first predetermined light receiving portions and second predetermined light receiving portions, wherein the first predetermined light receiving portions include no more than one-third of a total number of light receiving portions of the solid-state imaging device;
vertical transfer portions that are provided for each vertical column of the light receiving portions so as to transfer the signal charges read out from the light receiving portions in a vertical transfer portion;
readout electrodes to which a readout voltage for reading out the signal charges accumulated in the light receiving portions to the vertical transfer portions is applied;
a horizontal transfer portion to which the signal charges are transferred from the vertical transfer portions, and which transfers the transferred signal charges in a horizontal direction; and
a controller that is configured to apply a first readout voltage to the readout electrodes corresponding to the first predetermined light receiving portions during an exposure period and while the signal charges are accumulated in the first predetermined light receiving portions and the second predetermine light receiving portions, wherein an exposure period associated with each of the first predetermined light receiving portions and the second predetermined light receiving portions terminate at a same time such that the signal charges of the first predetermined light receiving portions and the second predetermined light receiving portions having exposure periods different from one another are subjected to a readout sequence at a same time.

3. The solid-state imaging device according to claim 1 or 2, wherein the controller is configured to apply a second readout voltage to the readout electrodes corresponding to second predetermined light receiving portions which are part of the light receiving portions and are not part of the first predetermined light receiving portions during the exposure period and after the readout voltage is applied to the readout electrodes corresponding to the first predetermined light receiving portions.

4. The solid state imaging device according to claim 2, wherein the first predetermined light receiving portions are located in every (3N−2)th row of the matrix.

5. The solid state imaging device according to claim 2, wherein the light receiving portions further comprise third predetermined light receiving portions, wherein an exposure period associated with each of the first predetermined light receiving portions, the second predetermined light receiving portions, and the third predetermined light receiving portions terminate at the same time, and wherein the signal charges of the first predetermined light receiving portions, the second predetermined light receiving portions, and the third predetermined light receiving portions have exposure periods different from one another and are each subjected to the readout sequence at the same time.

6. A driving method of a solid-state imaging device comprising the steps of:
reading out signal charges accumulated in first predetermined light receiving portions, which are part of light receiving portions, to charge transfer portions, which are formed to be adjacent to the first predetermined light receiving portions, in an exposure period and while signal charges corresponding to incident light are accumulated in the first predetermined light receiving portions and second predetermine light receiving portions, wherein the first predetermined light receiving portions include no more than one-third of a total number of light receiving portions of the solid-state imaging device and an exposure period associated with each of the first predetermined light receiving portions and the second predetermined light receiving portions terminate at a same time; and reading out signal charges of the first predetermined light receiving portions and the second predetermined light receiving portions at a same time, wherein the first predetermined light receiving portions and the second predetermined light receiving portions have exposure periods different from one another.

7. The driving method of a solid-state imaging device according to claim 6, further comprising the step of:

reading out signal charges accumulated in second predetermined light receiving portions which are part of the light receiving portions and are not part of the first predetermined light receiving portions to charge transfer portions which are formed to be adjacent to the second predetermined light receiving portions during the exposure period and after the signal charges accumulated in the first predetermined light receiving portions are read out.

8. An imaging apparatus comprising:
a solid-state imaging device; and
an optical system, wherein
the solid-state imaging device includes
light receiving portions that accumulate signal charges corresponding to incident light, the light receiving portions comprising first predetermined light receiving portions and second predetermined light receiving portions, wherein the first predetermined light receiving portions include no more than one-third of a total number of light receiving portions of the solid-state imaging device,
charge transfer portions that are formed to be adjacent to the light receiving portions so as to transfer the signal charges read out from the light receiving portions,
readout electrodes to which a readout voltage for reading out the signal charges accumulated in the light receiving portions to the charge transfer portions is applied, and
a controller that is configured to apply a first readout voltage to the readout electrodes corresponding to the first predetermined light receiving portions during an exposure period and while the signal charges are accumulated in the first predetermined light receiving portions and the second predetermined light receiving portions, wherein an exposure period associated with each of the first predetermined light receiving portions and the second predetermined light receiving portions terminate at a same time such that the signal charges of the first predetermined light receiving portions and the second predetermined light receiving portions having exposure periods different from one another are subjected to a readout sequence at a same time, and
the optical system guides the incident light to the light receiving portions.

9. An imaging apparatus comprising:
a solid-state imaging device; and
an optical system, wherein
the solid-state imaging device includes
light receiving portions that are arranged in a matrix form so as to accumulate signal charges corresponding to incident light, the light receiving portions comprising first predetermined light receiving portions and second predetermined light receiving portions, wherein the first predetermined light receiving portions include no more than one-third of a total number of light receiving portions of the solid-state imaging device,
vertical transfer portions that are provided for each vertical column of the light receiving portions so as to transfer the signal charges read out from the light receiving portions in a vertical transfer portion,
readout electrodes to which a readout voltage for reading out the signal charges accumulated in the light receiving portions to the vertical transfer portions is applied,
a horizontal transfer portion to which the signal charges are transferred from the vertical transfer portions, and which transfers the transferred signal charges in a horizontal direction, and
a controller that is configured to apply a first readout voltage to the readout electrodes corresponding to the first predetermined light receiving portions during an exposure period and while the signal charges are accumulated in the first predetermined light receiving portions and the second predetermined light receiving portions, wherein an exposure period associated with each of the first predetermined light receiving portions and the second predetermined light receiving portions terminate at a same time such that the signal charges of the first predetermined light receiving portions and the second predetermined light receiving portions having exposure periods different from one another are subjected to a readout sequence at a same time, and
the optical system guides the incident light to the light receiving portions.

10. An imaging apparatus comprising:
a solid-state imaging device including
light receiving portions that accumulate signal charges corresponding to incident light, the light receiving portions comprising first predetermined light receiving portions and second predetermined light receiving portions, wherein the first predetermined light receiving portions include no more than one-third of a total number of light receiving portions of the solid-state imaging device,
charge transfer portions that are formed to be adjacent to the light receiving portions so as to transfer the signal charges read out from the light receiving portions, and
readout electrodes to which a readout voltage for reading out the signal charges accumulated in the light receiving portions to the charge transfer portions is applied,
an optical system that condenses the incident light to be received by the light receiving portions;
a mechanical shutter that interrupts the incident light condensed by the optical system; and
a controller that applies a first readout voltage to the readout electrodes corresponding to the first predetermined light receiving portions during an exposure period and while the signal charges are accumulated in the first predetermined light receiving portions and the second predetermined light receiving portions, thus setting the exposure period of the first predetermined light receiving portions to a period that continues until the mechanical shutter is closed after the readout voltage is applied to the readout electrodes corresponding to the first predetermined light receiving portions, wherein an exposure period associated with each of the first predetermined light receiving portions and the second predetermined light receiving portions terminate at a same time such that the signal charges of the first predetermined light receiving portions and the second predetermined light receiving portions having exposure periods different from one another are subjected to a readout sequence at a same time.

11. An imaging apparatus comprising:
a solid-state imaging device including
  light receiving portions that are arranged in a matrix form so as to accumulate signal charges corresponding to incident light, the light receiving portions comprising first predetermined light receiving portions and second predetermined light receiving portions, wherein the first predetermined light receiving portions include no more than one-third of a total number of light receiving portions of the solid-state imaging device,
  vertical transfer portions that are provided for each vertical column of the light receiving portions so as to transfer the signal charges read out from the light receiving portions in a vertical transfer portion, and
  readout electrodes to which a readout voltage for reading out the signal charges accumulated in the light receiving portions to the vertical transfer portions is applied;
an optical system that condenses the incident light to be received by the light receiving portions;
a mechanical shutter that interrupts the incident light condensed by the optical system; and
a controller that applies a first readout voltage to the readout electrodes corresponding to the first predetermined light receiving portions during an exposure period and while the signal charges are accumulated in the first predetermined light receiving portions and the second predetermined light receiving portions, thus setting the exposure period of the first predetermined light receiving portions to a period that continues until the mechanical shutter is closed after the readout voltage is applied to the readout electrodes corresponding to the first predetermined light receiving portions, wherein an exposure period associated with each of the first predetermined light receiving portions and the second predetermined light receiving portions terminate at a same time such that the signal charges of the first predetermined light receiving portions and the second predetermined light receiving portions having exposure periods different from one another are subjected to a readout sequence at a same time.

12. The imaging apparatus according to claim 10 or 11, wherein the controller applies a second readout voltage to the readout electrodes corresponding to second predetermined light receiving portions which are part of light receiving portions and are not part of the first predetermined light receiving portions during the exposure period and after the readout voltage is applied to the readout electrodes corresponding to the first predetermined light receiving portions, thus setting the exposure period of the second predetermined light receiving portions to a period that continues until the mechanical shutter is closed after the readout voltage is applied to the readout electrodes corresponding to the second predetermined light receiving portions.

* * * * *